April 10, 1934.  G. W. HEISE ET AL  1,954,410
GALVANIC CELL AND CAUSTIC ELECTROLYTE THEREFOR
Original Filed Feb. 16, 1923
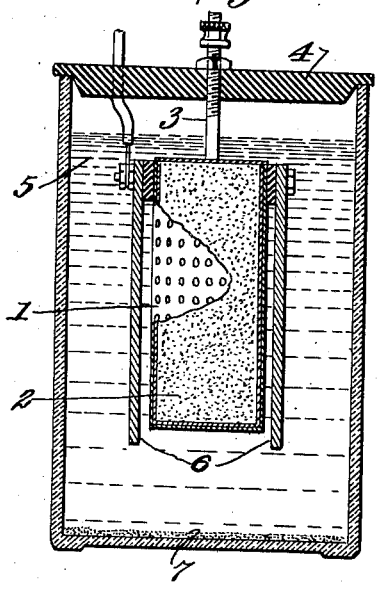
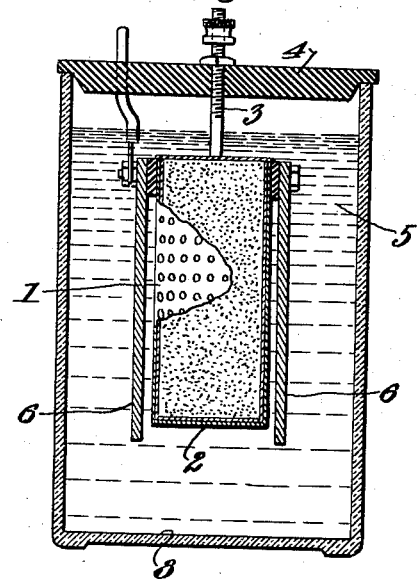
Inventors:
George W. Heise,
Clarence W. Brokate,
By Byrnes Townsend & Potter,
Attorneys.

Patented Apr. 10, 1934

1,954,410

UNITED STATES PATENT OFFICE 1,954,410

GALVANIC CELL AND CAUSTIC ELECTROLYTE THEREFOR

George W. Heise, Lakewood, and Clarence W. Brokate, Port Clinton, Ohio, assignors to National Carbon Company, Inc., a corporation of New York Original application February 16, 1923, Serial No. 619,464, now Patent No. 1,786,406, dated December 23, 1930. Divided and this application May 13, 1930, Serial No. 452,029

1 Claim. (Cl. 136—116)

This invention relates to cells of the type in which the electrolyte is a solution of caustic alkali, particularly copper oxid cells and this application is a division of our original application filed February 16, 1923, Serial Number 619,464, which has matured into Patent No. 1,786,406, granted December 23, 1930. The principal object of the invention is to improve the service characteristics of such cells by increasing the efficiency of the electrolyte.

By the methods of the present invention the service characteristics of copper oxid cells of the Lalande type are improved to a very marked degree. The improvement is particularly to be noted in the duration of effective service which can be obtained. As described more fully hereinafter, the useful life of the average cell may be more than doubled.

The invention is based upon the discovery that the addition of certain organic materials to the caustic electrolyte results in the valuable improvements mentioned. In addition, we have found that further benefits may be obtained by facilitating and controlling deposition of dissolved compounds of the soluble electrode metal.

The organic materials used do not appear to have any direct solvent or depolarizing action, but operate indirectly through their effect upon the caustic solution and the compounds dissolved in it. The present invention is distinguished in these respects from prior practice in which organic compounds, especially nitro compounds, adapted to combine with hydrogen liberated in the cell, are added to caustic alkali electrolyte. Such compounds do not produce the results described herein.

The preferred organic addition agents are generally complex compounds of relatively high molecular weight, and frequently exist as colloids in the caustic electrolyte. The proteins, gums, and resins are the chief sources of suitable addition agents. As specific examples, and without limitation thereto, material of the class consisting of: casein, saponin, albumin, mucilaginous materials, of the general type of glue, resins, lignin, tannins, and gum arabic and related gums, are listed as exerting a highly favorable effect. Other materials of the general nature indicated may be used, provided they do not have a detrimental action, for example combination with copper oxid, which would counteract their beneficial effect upon the electrolyte.

The amounts of the organic materials which should be added to and dissolved in the electrolyte will vary with the composition of the electrodes and electrolyte, and with the character of service required from the cell. In general it may be said that from 5 to 25 grams are sufficient for each liter of electrolyte of caustic alkali having a specific gravity of about 1.23, when used in combination with a zinc anode and copper oxid depolarizing cathode.

In the preferred form of the invention, the product obtained by treating wood with caustic alkali is used to effect the improvements described. According to one desirable method, wood is treated with a caustic solution, preferably at boiling temperature, and the resulting liquid product is used as the electrolyte. Resinous woods, especially pine, have been found to be well adapted for use in this connection. In some cases resinous products may be used instead of wood. The electrolyte composition may be prepared in various ways, and the following specific procedure is given by way of example only:

About 300 grams of pine wood in suitably subdivided form, for example shavings or sawdust, is digested at room temperature with 2000 cc. of sodium hydroxid solution having a specific gravity of about 1.23, for about a week. Or the wood may be boiled or macerated with the solution for approximately two hours. In some cases it may be desirable to make a concentrated solution of the wood extractives and to add the desired amount of such solution to the electrolyte. The extractives appear to be in part at least in colloidal condition.

The following example is illustrative of the effect of the organic addition agents. A cell comprising 2 liters of 21% sodium hydroxid solution, with zinc and copper oxid in excess as the electrodes, gave 240 ampere hours of continuous service on 0.5 ampere drain before falling below the limiting voltage (about 0.6 volt). A cell precisely similar except that the electrolyte carried wood extractives, as described above, gave 490 ampere hours of continuous service before reaching the limiting voltage, failure in this case being due to copper oxid exhaustion.

The beneficial effect of the organic addition agents appears to be due in the main to their power to lessen materially the formation of adherent crystalline deposits upon the electrodes. Exhausted caustic soda cells frequently are found to have the anode covered with a crystalline deposit and this is doubtless an important factor in terminating the life of the cell. When organic materials of the kind described are present, the anode metal, such as zinc, separates from the electrolyte in the form of compounds which are less adherent to the anode surface. In many cases the zinc compounds are substantially completely precipitated in the form of a non-adherent sludge.

The practical result obtained is a large increase in the solvent action of the caustic solution upon the anode metal. This may be due wholly to the prevention of the formation of obstructing crystalline deposits, referred to above, or partly to a direct increase in zinc solubility of the electrolyte due to the presence of the organic material. Whatever the true theoretical explanation, the effect upon the cell is extremely favorable. In some of our tests we have in fact made practical use of electrolyte in which so much precipitation had taken place that a gelatinous mass was produced. The residual caustic nevertheless was still capable of dissolving zinc. Such use of untreated electrolyte is entirely impracticable.

In order further to insure the continued exposure of active anode surface, precipitation may be induced at the desired portion of the cell.

For example, a granular and preferably crystalline material, substantially insoluble in the electrolyte, may be placed in the cell and the zinc compounds will crystallize thereon, leaving the anode relatively free from obstructing deposits. A thin rough-surfaced layer of sand or fragmentary alundum upon the bottom of the cell jar is suitable for this purpose. Various other materials of the general type indicated may be used.

The same result may be obtained by roughening the inner surface of the cell jar. For example, when glass jars are used, the bottom and lower side portions of the jar may be etched on the inside by treatment with hydrofluoric acid. Sand blasting or other equivalent means may be substituted for the acid treatment. Crystal growths tend to form upon the roughened surfaces, rather than upon the zinc, and a better exposure of the metal to the electrolyte is obtained.

This phase of the invention is illustrated in the accompanying drawing, in which Fig. 1 is a vertical central section through a caustic alkali cell having a layer of insoluble material adapted to promote crystallization, and Fig. 2 is a similar view in which the surface of the cell jar is roughened to effect the same result.

In the drawing, reference numeral 1 denotes a perforated container, for copper oxid or other depolarizer 2, suspended by rod 3 from cover 4 and immersed in a liquid solution of caustic electrolyte 5. Anodes 6, preferably of zinc, are secured in insulated relation to the container. A layer of sand, alundum, or other suitable material 7, is shown in Fig. 1. The container 1 in Fig. 2 has a portion of its inner surface roughened, as at 8.

Obvious commercial advantages accrue from the very large increase in ampere hour capacity obtainable by the present invention. It is now customary to use a considerable volume of electrolyte, in order to obtain a large ampere hour capacity and this volume cannot be materially increased without exceeding the practical limitations upon the size of the cell containers. It is therefore important to obtain the maximum effect from a given volume of electrolyte. According to the present method, more service may be obtained from cells of the size now standard, or the normal present service may be obtained with a cell of considerably smaller electrolyte volume.

These advantages usually may be attained without the presence of means for localizing crystallization, but it is sometimes desirable to adopt such means as an adjunct to the improved electrolyte, or for controlling deposition of compounds from caustic electrolyte containing no organic materials.

The improved results obtained by our invention are not dependent upon the specific procedure described, and various modifications in this procedure may be made within the scope of the appended claim.

We claim:

A galvanic cell of the Lalande type comprising a container having anode and cathode elements therein, and a liquid electrolyte in said container comprising caustic alkali solution having dissolved therein material selected from a group consisting of casein, saponin, albumin, glue, resins, lignin, tannins, and gum arabic, such material being adapted to coact with the reaction products in the liquid electrolyte to separate the same therefrom in the form of compounds which are capable of freely precipitating through said liquid electrolyte to the bottom of said container whereby the activity of the electrolyte is maintained at a high degree.

GEORGE W. HEISE.
CLARENCE W. BROKATE.